Aug. 12, 1930.   C. H. SMOOT   1,772,920
REGULATOR
Filed Nov. 17, 1928
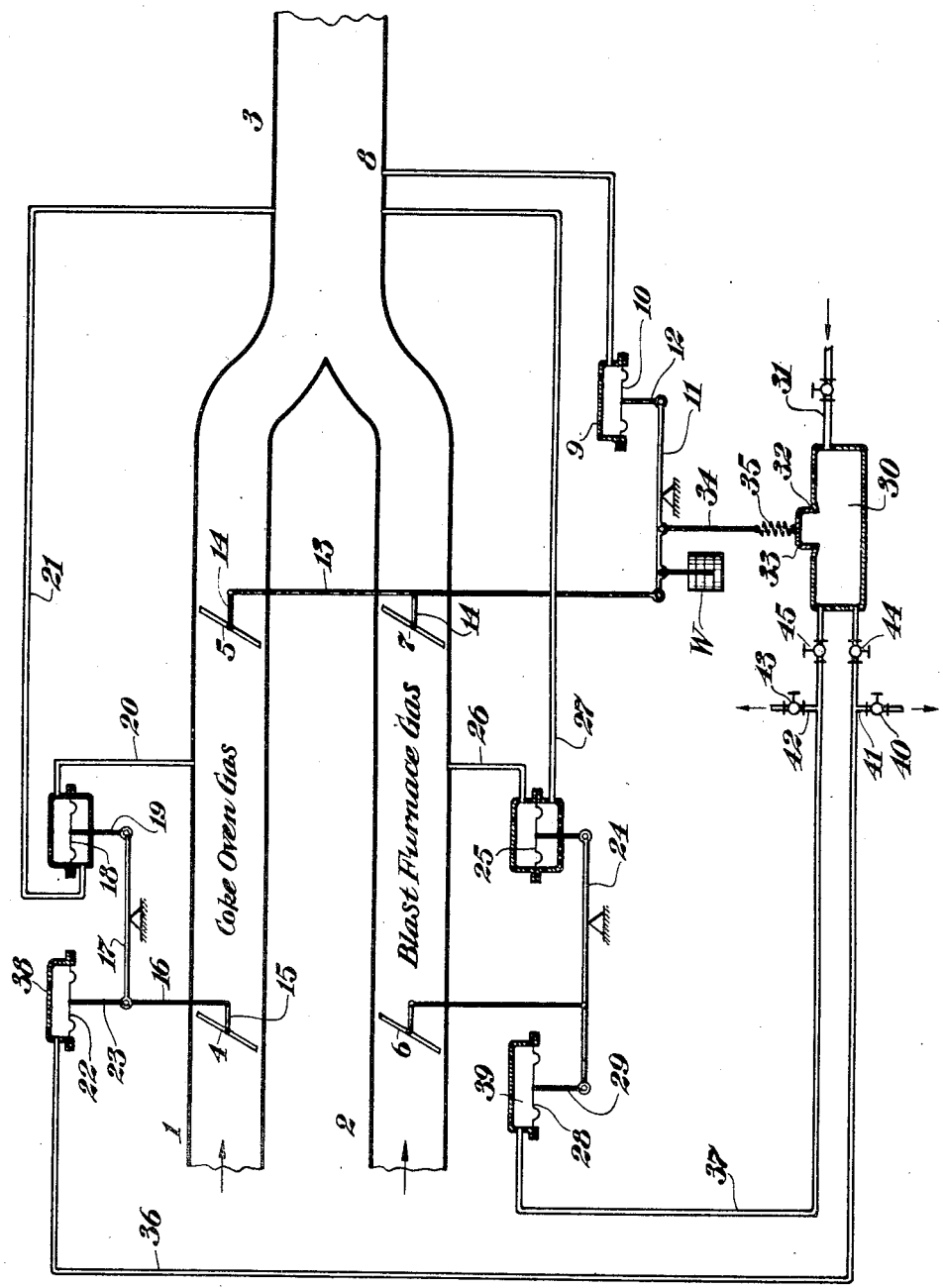
INVENTOR
*Charles H. Smoot,*
BY
*Eyn, Scott & Keil*
ATTORNEY Patented Aug. 12, 1930

1,772,920

UNITED STATES PATENT OFFICE

CHARLES H. SMOOT, OF MAPLEWOOD, NEW JERSEY

REGULATOR

Application filed November 17, 1928. Serial No. 320,082.

My invention relates to the art of regulation and has for its purpose the provision of accurate means for maintaining a proper relationship between two or more flows. My regulator is particularly applicable to the case where several separate fluid flows combine into a single fluid flow and it is desired to control the pressure, for example, of the mixture as well as to maintain the proportionality between the various constituents. My apparatus provides means as well for varying at will the relationship between the various flows irrespective of the value to which the pressure of the mixture is regulated.

For a better understanding of my invention reference should be had to the accompanying drawing in which I have illustrated diagrammatically my novel regulator as applied to the control of the flows of blast furnace and coke oven gases.

Referring to the drawing, coke oven gas flowing through conduit 1, and blast furnace gas flowing through conduit 2, in the direction of the arrows, unite in a common conduit 3. Dampers 4 and 5 in the conduit 1, and 6 and 7 in the conduit 2 control the fluid flows through the respective conduits. In the particular modification illustrated the pressure of the mixture at the point 8 within the conduit 3 is maintained constant. This pressure at the point 8 is transmitted to a closed chamber 9 and exerts therein a downward force upon a diaphragm 10 forming the lower wall of the chamber. Movement of the diaphragm 10 due to any change in the pressure at point 8 is transmitted to a balancing device, indicated diagrammatically as a pivoted lever 11, by means of a rod 12 attached to the diaphragm 10 and to the lever 11. A weight W attached to the lever 11 opposes the normal downward force exerted on the lever 11 by the pressure in chamber 9. Any movement of the lever 11 due to variations from the normal value of the pressure of the mixture is transmitted through a link 13 and arms 14 to the dampers 5 and 7; an increase or decrease in the pressure of the mixture causing the dampers to close or open respectively.

If the pressure of the gas supplies were always constant, and if the movements of the dampers 5 and 7 were perfectly uniform, the regulation of these dampers alone might be sufficient. In practice, however, the gas supplies are not maintained at uniform pressures, and the movements of the dampers cannot be so accurately controlled. Additional means are therefore essential to maintain the proper proportionality between the constituent flows. These additional means comprise the dampers 4 and 6 with their respective controlling means. The damper 4 is controlled through an arm 15 and link 16 by the position of a balancing device, diagrammatically illustrated as a pivoted lever 17. Acting upon the lever 17 to turn it in a clockwise direction is a force measuring the drop in pressure across the damper 5, which force acts downward upon a diaphragm 18 attached to the lever 17 by means of a rod 19. The diaphragm 18 on its upper surface is exposed to the pressure in the conduit 1 in advance of the damper 5 by means of the pipe 20, and is exposed on its underside to the pressure in the mixing conduit 3 by means of the pipe 21. Acting on the lever 17 in a direction to oppose the turning thereof by the force derived from the pressure drop across the damper 5 is a force created by a fluid pressure acting upon a diaphragm 22 attached to the lever 17 by a rod 23.

The control of damper 6 is similar to that above described for damper 4 and comprises a balancing device 24 acted upon by the differential of forces derived from the pressure in advance of the damper 7 and in the mixing conduit 3 as transmitted to either side of a diaphragm 25 through pipes 26 and 27 respectively and by an opposing force created by a fluid pressure acting upon a diaphragm 28 attached to the balance 24 by a rod 29.

The pressures acting upon diaphragms 22 and 28 are arranged to decrease as the dampers 5 and 7 approach their closed positions, with the result that as dampers 5 and 7 close, smaller and smaller pressure drops across them tend to close dampers 4 and 6. The means for varying the pressures acting upon diaphragms 22 and 28 will now be described. A chamber 30 into which an auxiliary fluid, such as air, is admitted under pressure through the valve controlled pipe 31 has a leakage port 32 controlled by a cup 33, which is connected to the lever 11 by means of a member 34 and spring 35. The pressure within chamber 30 thus varies with the position of lever 11; a clockwise rotation of the lever decreasing the tension of spring 35 and thus reducing the pressure in the chamber 30, and a counter-clockwise rotation of the lever 11 increasing the tension of spring 35 and thus increasing the pressure in chamber 30. Chamber 30 is connected through pipes 36 and 37 with chambers 38 and 39 respectively, the lower walls of which are formed by the diaphragms 22 and 28 respectively. The pressures in chambers 38 and 39 which vary with the pressure in chamber 30 will thus vary with the position of dampers 5 and 7, decreasing as the dampers approach their closed positions.

The provision of dampers 4 and 6 with the above described controlling means therefor insures proper relationship between the two gas flows at all times, and gives substantially accurate regulation over a wide range of flows by progressively reducing the amount of closure of dampers 5 and 7, thus avoiding inaccuracies inherent in other regulators of this type.

A branch exhaust pipe 41 controlled by a valve 40 is connected to pipe 36 and a similar branch exhaust pipe 42 controlled by a valve 43 is connected to the pipe 37. Pipes 36 and 37 are provided with adjustable valves 44 and 45 between chamber 30 and the respective exhaust pipes. The provision of valves 40 and 43 permit of a wide range of adjustment at a central point of the ratio between the two gaseous flows. A partial closure of valve 40 with valve 43 open and with valves 44 and 45 equally set, results in a higher pressure in chamber 38 than in chamber 39 with a correspondingly larger flow through conduit 1 than through conduit 2. Valves 44 and 45 permit of adjustment of the ratios of the pressure in chamber 30 to the pressures in chambers 38 and 39, and likewise may be employed to vary the ratio between the two flows.

In operation, as the pressure in conduit 3 begins to rise, due for instance to a decrease in demand of the mixture at some point of consumption, the lever 11 is rotated in a clockwise direction to close dampers 5 and 7 and to increase the leakage through port 32 by decreasing the tension of spring 35. The decrease in pressure in chamber 30, being transmitted to chambers 38 and 39 through pipes 36 and 37 respectively results in a tipping of levers 17 and 24 in a clockwise direction with a resulting closure of dampers 4 and 6. If dampers 4 and 6 were regulated to constant pressure drops across dampers 5 and 7, instead of to varying drops depending upon the setting of dampers 5 and 7, these latter dampers when the pressure at 8 increased would have had to close sufficiently to restore the proper pressure in conduit 3, whereas, with the described arrangement, part of the pressure reduction is handled by the closure of dampers 4 and 6. Conversely, upon a decrease in pressure in conduit 3 due to an increased consumption of the gaseous mixture, the dampers 5 and 7 are partially opened, the pressure in chamber 30 is increased and as a result the dampers 4 and 6 are partially opened as well.

In case of a variation in the supply pressure of one or the other of the gases, for instance an increase in the supply pressure of the coke oven gas, the pressure differential across damper 5 increases which causes damper 4 to close to return the flow to its former value. Similarly, an increase in the supply pressure to conduit 2 causes damper 6 to close independently of damper 4.

It will thus be seen that the dampers 4 and 6 operate together to increase the range of operation of dampers 5 and 7 in controlling the pressure of the mixture, as they are in effect regulated responsively to the pressure of the mixture, and operate independently to maintain the proper flow through their respective conduits.

I have now described one embodiment of my invention as applied to a particular regulating problem. It will be understood that the balancing devices 11, 17 and 24 are purely diagrammatic, and might be any type of well known balanced regulators employing auxiliary power means for effecting the actual movement of the dampers. I prefer the means illustrated for varying the controlling forces upon the balances 17 and 24, but any other means for varying these forces responsively to the regulation of the mixture could be employed.

I have described my regulator for convenience as applied to the maintenance of a constant pressure of a mixture of two flows and to the maintenance of a desired ratio between the two flows. Obviously my apparatus is not limited to the precise number of flows to be regulated nor to the regulation of any particular function of the total mixture. If it is desired that the pressure, or other regulated function, of the mixed gases, vary instead of remain constant, it is only necessary to substitute any suitably varying force for the weight W on the lever 11.

I claim:

1. In a mechanism for controlling a plurality of fluid flows, a regulator for each flow, a device responsive to a varying function of all of the flows and to a regulating force for controlling all of said regulators in unison, and means including a second regulator for each fluid flow for increasing the range of operation of said device and for maintaining a definite ratio between the various fluid flows.

2. In a regulator for a plurality of fluid flows, means including a regulator for each flow for controlling all of said flows in unison in response to a varying function of all of said flows and to a regulating force, a second regulator for each flow, means for increasing the range of operation of said first mentioned regulators by controlling said second regulators in unison in response to said varying function, and means for maintaining a predetermined ratio between said flows by controlling each of said second regulators independently in response to a function of the particular flow associated therewith.

3. A mechanism for controlling the pressure of a mixed fluid and for controlling the flow of constituent fluids thereto comprising in combination a damper for each constituent flow, means responsive to the pressure of the mixed fluid and to a regulating force for controlling said dampers in unison, and means including a second damper for each constituent flow for maintaining definite pressure differences across said first mentioned dampers and for progressively increasing and decreasing the same with opening and closing respectively of said first mentioned dampers.

4. Apparatus as in claim 3 including means for manually adjusting the ratio between the pressure differences across said first mentioned dampers.

5. In a regulator for controlling a plurality of fluid flows, two regulators for each of said flows, a device responsive to a varying function of the total of all of said flows and to a regulating force adapted to adjust in unison one of said regulators for each flow, a plurality of other devices each one of which is associated with and arranged to control one of the other regulators for said flows, and means for acting upon each of said last mentioned devices responsively to a function of the particular flow adjusted by the regulator associated therewith and also responsively to said varying function of the total of all the flows.

6. Mechanism for controlling the pressure of a mixed fluid and for controlling the flow of constituent fluids thereto, comprising in combination a regulator adapted to vary the flow of one constituent, a second regulator adapted to vary the flow of said constituent, means responsive to the pressure differential across said first mentioned regulator and to the position thereof for controlling said second regulator, a regulator adapted to vary the flow of a second constituent, a second regulator adapted to vary the flow of said second constituent, means responsive to the pressure differential across said first mentioned regulator for said second constituent and to the position thereof for controlling said second regulator for the second constituent, and means responsive to the pressure of the mixed fluid and to a regulating force for controlling both of the first mentioned regulators for said two constituents.

In testimony whereof, I have signed my name to this specification.

CHARLES H. SMOOT.